April 22, 1941.   R. A. CONNER   2,239,592
VEHICLE BRAKE SYSTEM
Filed July 27, 1940   2 Sheets-Sheet 1

Inventor
R. A. Conner
By Blair & Kilcoyne
Attorneys

April 22, 1941.  R. A. CONNER  2,239,592
VEHICLE BRAKE SYSTEM
Filed July 27, 1940  2 Sheets-Sheet 2
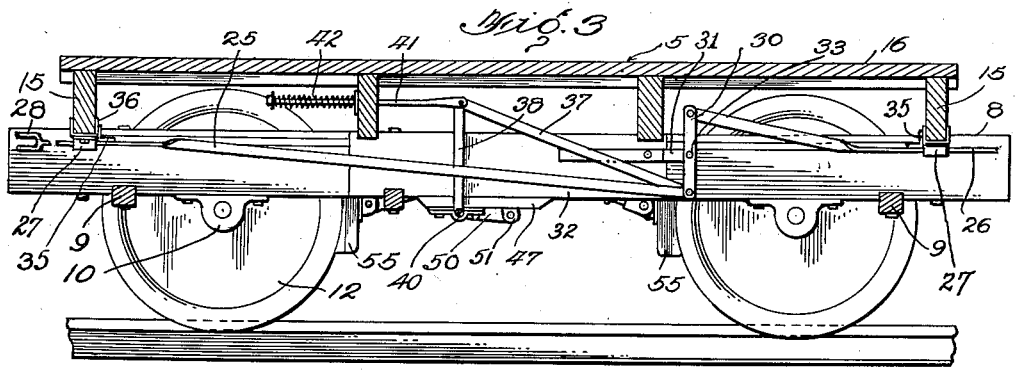
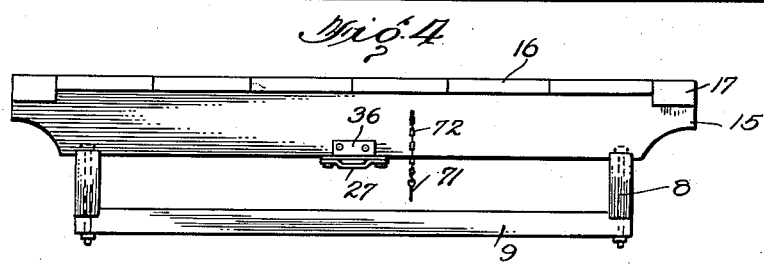
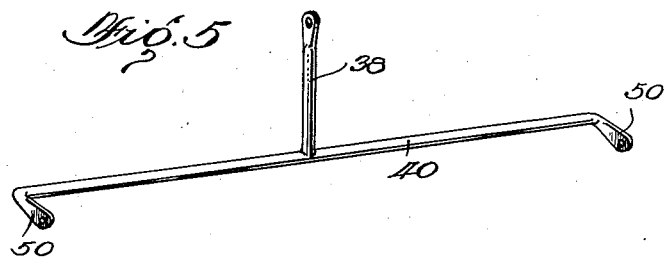
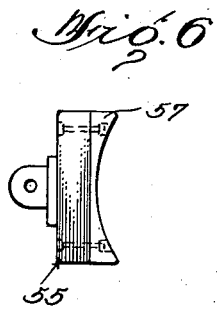
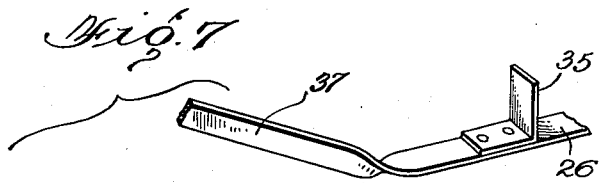
Inventor
R. A. Conner
By Blair & Kilcoyne
Attorneys Patented Apr. 22, 1941

2,239,592

UNITED STATES PATENT OFFICE 2,239,592

VEHICLE BRAKE SYSTEM

Robert A. Conner, St. Augustine, Fla., assignor to himself, D. L. Brett and Bertram C. Mickler, jointly, all of St. Augustine, Fla.

Application July 27, 1940, Serial No. 348,043

14 Claims. (Cl. 188—125)

This invention relates to improvements in vehicle brake systems and in its more specific aspects to an automatically operable brake system adapted for use with railway push cars and like trailer vehicles.

Among the objects of the present invention may be noted the provision of a novel and improved brake system for use on push cars and like trailer vehicles which is entirely self-acting and automatic in its operation; the provision of a brake system having special application to towed vehicles such as railway push cars of the character adapted to be hauled by a motor car, and which is so organized and arranged as automatically to go into operation upon cessation or substantial lessening of the pull of the motor car, due either to application of the brakes with which the motor car is conventionally provided, or to the push car tending to overrun the motor car in negotiating down grades; the provision of a brake system as aforesaid which may be applied as standard equipment to new push cars and like vehicles as well as to existing push cars already in use; the provision of a brake system for railway push cars and like trailer vehicles which is capable of applying maximum braking pressure to the wheels thereof, while at the same time being so organized with the railway vehicle that its parts are arranged substantially at or above the level of the main longitudinal sills of the vehicle wheel frame; and the provision of a brake system as aforesaid which is characterized by simplicity in design and construction, which may be inexpensively manufactured and installed, and which is rugged and durable in use and highly effective in its operation.

Other objects will be in part obvious and in part hereinafter pointed out in connection with the following analysis of this invention wherein is illustrated an embodiment of the invention in detail.

In the drawings—

Fig. 3 is a section along lines 3—3 of Fig. 1;

Fig. 4 is a partial end view of the push car frame construction;

Fig. 5 is a perspective illustrating the brake shaft employed in the brake system as aforesaid;

Fig. 6 is a detail of a brake shoe; and

Fig. 7 is a broken-away detail illustrating the draft connection between the combined pull and draft bar and the push car frame.

Figure 1:
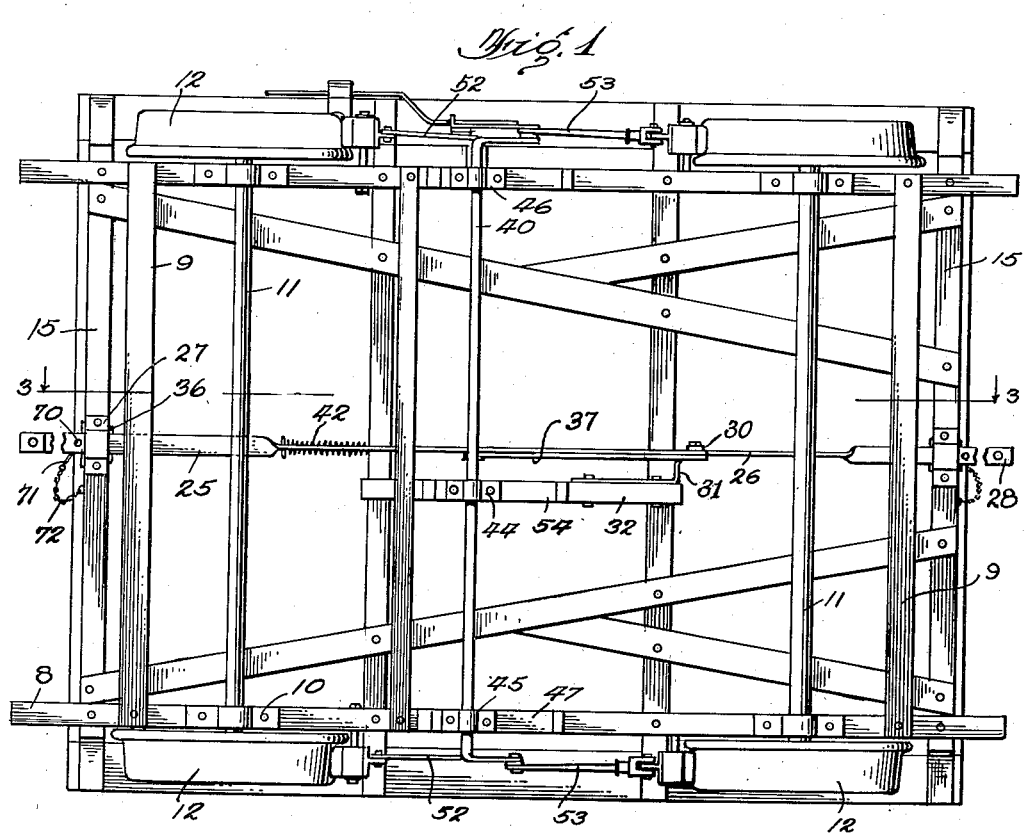
Fig. 1 is an under view of a conventional railway push car having applied thereto the brake system of the present invention.

Referring to the drawing wherein like reference characters designate like parts throughout the several views, reference character 5 indicates generally a push car of conventional construction, which of itself forms no part of the present invention, and hence is only generally described. Such a push car generally includes a wheel frame formed by the main longitudinal sills 8 and cross sills 9. The longitudinal sills 8 carry journal boxes 10 for the wheel axles 11, the wheels 12 as shown being of the flanged type adapted to run on tracks 13. Mounted on the wheel frame is a platform frame comprising main transverse sills 15 to which are secured the platform floor boards 16, longitudinal sills 17 being arranged along the side edges of the platform.

As is well known, push cars of the general character referred to are employed by the railroads to haul section workers and their tools to and from locations where track is under construction or repair. Such cars are often called upon to carry loads up to five thousand pounds and are usually towed by motor cars. Heretofore, the only braking available was that provided by the motor car brake system which, under heavy load conditions, is inadequate to apply the heavy brake force required to slow down or stop entirely a loaded push car under conditions requiring the same, with the result that excessive wear on the motor car brakes has taken place, and in many cases serious accidents have occurred.

The brake system of the present invention is of the character as automatically to go into operation upon any tendency of a loaded push car to overrun the motor car and to this end the usual draft connections between the motor and push cars are removed, the draft being applied to the push car through longitudinally extending pull bars 25, 26, one for each end of the car. As will be described hereinafter, the pull bars 25, 26, also act as thrust bars, being each mounted for reciprocation with reference to the car frames in brackets 27 secured to the under face of the transverse platform sills 15.

Each of the combined pull and thrust bars 25, 26 is provided at its coupling end with a coupling yoke 28 whereby the motor car (not shown) may be coupled to either end of the push car. Referring to Figs. 1 and 3, the pull bars 25, 26 extend beneath the car and in a direction towards each other, and at their relatively rearward ends are each connected to the opposite ends of an equalizing bar 30 of relatively short radius, which is carried by a bracket 31 fixedly secured to an intermediate longitudinal sill 32 disposed between the intermediate transverse sills 9 of the wheel frame and the intermediate transverse sills 15 of the platform frame. As more clearly shown in Fig. 3, equalizing bar 30 has a vertical position in which it is normally maintained and is fulcrumed on pivot pin 33 intermediate its ends to its carrying bracket 31.

The pull and thrust bars 25, 26 adjacent their coupling ends are disposed horizontally but intermediate their ends are preferably turned 90° to lie in a vertical plane, thus to permit ready connection with the vertically disposed equalizing bar 30.

Adjacent its coupling end each of the pull bars 25, 26 is provided with an angled stop or pull bracket 35 (Fig. 7), one leg of which is adapted to be secured to the horizontal end portion of the bar, the other leg extending vertically to engage against the inner vertical face of a transverse end sill 15. The positioning of the stops 35 along the length of the pull bars is such that the stops engage against sills 15 when the equalizing bar 30 is in its normal, vertical position. Preferably, the faces of the sills 15 engageable by the angled stops, as well as the opposite faces thereof, are protected from wear as by the provision of U-shaped wear plates 36.

In the construction so far described, it will be understood that upon coupling either one of the pull bars 25, 26 to the motor car, the latter exerts a pull on the coupled draft bar, which is transmitted to the push car frame through the related stop 35. It will be seen also that the motor car can be coupled to either end of the push car for towing the same in either direction.

Connected to the lower end of the equalizing bar 30, and preferably by the same pin securing the pull bar 25 thereto, is a pull link 37 which extends angularly upwards and whose end is connected to a normally upright and elongated actuating arm 38 for the transversely extending brake shaft 40. By reference to Fig. 5, the shaft arm 38 is disposed intermediate the ends of the shaft, and at its upper end is connected to a spring carrying rod 41 which extends generally horizontally through one of the sills 15 and carries at its free end a compression spring 42. The arrangement is such that spring 42 is compressed upon clockwise turning movement imparted arm 38, its function being to maintain shaft arm 38, and hence equalizing bar 30, in their normal vertical positions, and also to maintain the bars 25, 26 in a normal longitudinal position in which their stops 35 engage the frame sills 15.

The brake shaft 40 is mounted for rocking movement in an intermediate bearing 44 carried by the under face of the thrust sill 32, and in end bearings 45, 46, carried, respectively, by the longitudinal frame sills 8. Preferably, each of said sills carries a filler block 47 whereby the bearings 44, 45 and 46 are effectively disposed in the same horizontal plane.

Figure 2:
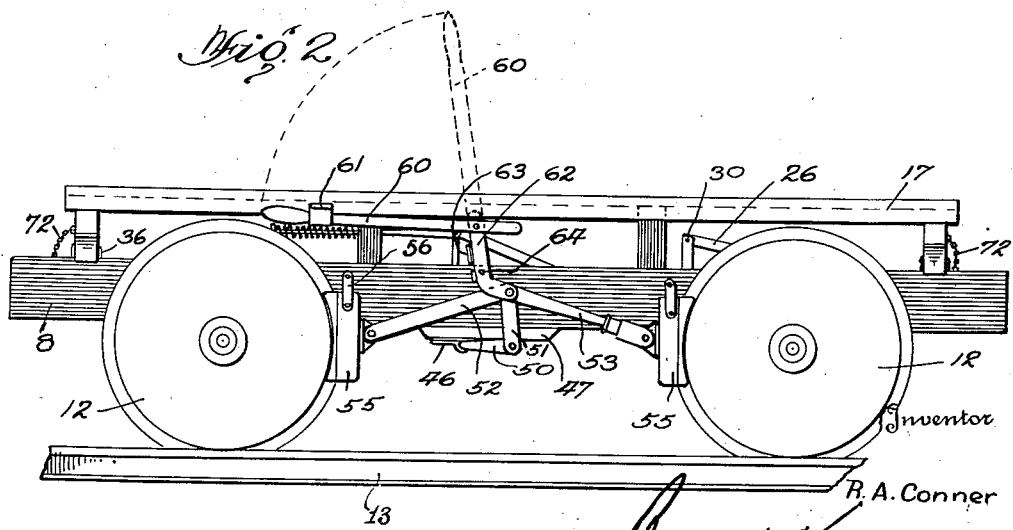
Fig. 2 is a side view of the push car and brake system as illustrated in Fig. 1 and which further illustrates a secondary actuating means by which the brakes may be manually applied under conditions requiring the same.

Each end of the brake shaft 40 is provided with a relatively short crank arm 50 (Fig. 5), said crank arms being disposed substantially at right angles to the intermediate arm 38 thereof, thus to take up a normal, horizontal position. The free end of each crank arm 50 is connected through a link 51 to the adjacent ends of the toggle bars 52, 53 of a toggle mechanism disposed on each side of the car, the relatively outer ends of each toggle bar set being pivotally connected to brake shoes 55, which are suitably secured as by hang links 56 to the frame sills 8. The arrangement is such that as shaft cranks 50 are turned clockwise (Figs. 2 and 3), the effective length of the toggle bars 52, 53 is increased and the brake shoes move from their normally inactive position against the car wheels 12. By reference to Fig. 6, each brake shoe carries a replaceable wear plate 57 whereby upon the occurrence of wear, a new wear plate may be readily substituted for a worn shoe plate.

The action of the system so far described is as follows: Assuming the combined pull and thrust rod 25 is coupled with the motor car, so that the push car is traveling to the left, draft is applied to the car frame through the pull bracket 35 bearing on the transverse sill 15 at the left end of the car. Upon any tendency of the push car to overrun the motor car, the pull and thrust bar 25 moves to the right against the action of spring 42. Such rightwise thrust movement of bar 25 turns equalizing bar 30 about its mid point in counterclockwise direction, resulting in clockwise rotation of the shaft arm 38 through connection of pull link 37 therewith. Brake shaft 40 is now rocked on its axis in clockwise direction, causing like rocking movement of the crank arms 50 and application of the brakes to the wheels 12, whereupon the forward motion of the car is retarded in automatic manner. Upon checking of the speed of the pull car having been effected to the degree that its tendency to overrun the motor car is overcome, rod 25 returns to its normal pull position under the action of spring 42.

The same action takes place when the motor car is coupled with the pull and thrust bar 26 for pulling the car from its other end, in which event bar 26 moves to the left upon any tendency of the push car to overrun the motor car. Such leftwise movement of bar 26 imparts counterclockwise rotation to the equalizing bar 30, and hence the application of the brakes in the manner described.

By reference to Fig. 3, it will be seen that both the vertically disposed equalizing bar 30 and shaft arm 38 move throughout horizontal arcs, with the shaft crank arms 50 each moving throughout a vertical arc. By this and the further arrangement of the short radius of equalizing bar 30, the long radius of shaft arm 38 and the short radius of shaft crank arms 50, there results a force multiplying system by which maximum braking effort can be obtained as is necessary to check the speed of heavily loaded push cars.

It will be appreciated from the above that the entire linkage system is disposed substantially at or above the level of the longitudinal frame sills 8. This disposition of the system is important in normal usage of push cars which are intended to be manually lifted from the track and lowered to ground level, thus giving rise to the practical requirement that its brake system employ no depending or underhanging parts which could be injured by hitting an obstruction when a push car is run on the ground level.

Under some conditions a manual application of the brakes is necessary or desirable. To this end, the toggle mechanism of the system may be manually operated independently of rearward thrust on bars 25, 26 through a handle 60 normally carried in out-of-the-way position at one side of the car as by a hand clip 61. The operating end of the handle 60 is pivoted short of its end to a bellcrank 62, one arm of which is provided with a lug 63 for engagement by the handle end as the handle is moved to its dotted line position shown in Fig. 2. The bellcrank 62 is pivoted to turn about fulcrum point 64, its other arm being pivotally connected to the adjacent ends of the toggle bars 52, 53 preferably by the same pin by which pull link 51 is connected thereto. As arm 60 upon its disconnection from clip 61 is moved throughout its lost motion arc as indicated, it has no effect in applying the brake. However, upon its end engaging bellcrank lug 63, further turning movement of the handle in a clockwise direction causes like turning movement of bellcrank 62 about its fulcrum 64, with the result that the operative end of the bellcrank, through toggle bars 52, 53, spreads the brake shoes thus to apply braking effect on the wheels 12, in the same manner as automatically effected upon rearward movement of rods 25, 26.

As a single handle mounted on one side only of the car is contemplated, it will be understood that handle operation must result in actuation of both of the brake toggle mechanisms. To provide for this condition, link 51 on the handle side of the car acts as a push link during manual operation, and transmits turning movement of the bellcrank 62 to the related shaft crank arm 50 and hence to shaft 40. Crank arm 50 at the other side of the car is accordingly turned to actuate the toggle mechanism on that side of the car and simultaneous actuation of both toggle mechanisms results.

To provide for conditions requiring backing of the push car on to a siding, for example, each of the push bars 25, 26 is provided with a pin hole 70 disposed intermediate its stop 35 and its coupling yoke 28. A pin 71 carried by each of the end sills 15 as through a chain 72 is adapted for insertion in a related bar hole 70 and when so inserted to bear against the front wear plate 36 provided on the end sills as described. Pin 70 functions to prevent relative rearward movement of the bars with which they are associated, as would normally result in application of the brakes, and accordingly rearward thrust applied to a bar can be transmitted to the car frame through an inserted pin for backing of the car as may be required.

As many changes could be made in carrying out the above constructions without departing from the scope of the invention, it is intended that all matter contained in the above description or shown in the accompanying drawings shall be interpreted as illustrative and not in a limiting sense.

I claim:

1. A brake system for push cars and like trailer vehicles comprising, in combination, a combined pull and thrust bar reciprocably mounted on the car frame, means at the relatively forward end of said bar for coupling the same to a motor car, a stop carried by said bar adjacent said end adapted normally to engage a fixed part of the car frame and operative to transmit draft to said frame, normally inactive wheel-braking means carried by said car, and actuating means therefor operative between the braking means and the bar to transmit to said braking means any rearward thrust on the bar occurring upon tendency of the push car to overrun its motor car and thereby to apply said braking means, said actuating means including a member pivoted for turning movement about a fixed axis in response to rearward thrust on the bar, a rock shaft, a pull link connection between the pivoted member and the rock shaft, and an operating connection between the rock shaft and the braking means.

2. A brake system for push cars and like trailer vehicles comprising, in combination, a combined pull and thrust bar reciprocably mounted on the car frame, means at the relatively forward end of said bar for coupling the same to a motor car, a stop carried by said bar adjacent said end adapted to engage a fixed part of the car frame and operative to transmit draft to said frame, wheel-braking means carried by said car, means for maintaining said stop in a normal position in which it engages said fixed frame part and for rendering said braking means normally inactive, and brake actuating means operative between the braking means and the bar to transmit to the braking means any rearward thrust on the bar occurring upon tendency of the push car to overrun its motor car and thereby to apply said braking means, said actuating means including a member pivoted for turning movement about a fixed axis in response to rearward thrust on the bar, a rock shaft, a pull link connection between the pivoted member and the rock shaft, and an operating connection between the rock shaft and the braking means.

3. A brake system for push cars and like trailer vehicles comprising, in combination, a combined pull and thrust bar reciprocably mounted on the car frame, means at the relatively forward end of said bar for coupling the same to a motor car, a stop carried by said bar adjacent said end adapted to engage a fixed part of the car frame and operative to transmit draft to said frame, normally inactive wheel-braking means carried by said car, and actuating means therefor operative between the braking means and the bar to transmit to said braking means any rearward thrust on the bar occurring upon tendency of the push car to overrun its motor car and thereby to apply said braking means, said actuating means including a member pivoted for turning movement in response to rearward thrust on the pull and thrust bar, a rock shaft, a pull link connection between the pivoted member and the rock shaft, and toggle mechanism carrying brake shoes responsive for its actuation to turning movement of the rock shaft.

4. A brake system for push cars and like trailer vehicles comprising, in combination, a combined pull and thrust bar reciprocably mounted on the car frame, means at the relatively forward end of said bar for coupling the same to a motor car, a stop carried by said bar adjacent said end adapted to engage a fixed part of the car frame and operative to transmit draft to said frame, wheel-braking means carried by said car, means for maintaining said stop in a normal position in which it engages said fixed frame part and for rendering said braking means normally inactive, and brake actuating means operative between the braking means and the bar to transmit to the braking means any rearward thrust on the bar occurring upon tendency of the push car to overrun its motor car and thereby to apply said braking means, said actuating means including a member pivoted for turning movement in response to rearward thrust on said pull and thrust bar, a rock shaft, a pull link connection between the pivoted member and the rock shaft, and toggle mechanism carrying brake shoes responsive for its actuation to turning movement of the rock shaft.

5. A brake system for push cars and like trailer vehicles comprising, in combination, combined pull and thrust bars, one for each end of the car and each reciprocably mounted on the car frame, means at the relatively forward end of each bar for coupling the same to a motor car whereby the motor car can be coupled to either end of the push car, a stop carried by each bar adjacent its coupling end and adapted normally to engage a fixed part of said frame thereby to transmit draft to the car frame, wheel-braking means carried by said car, and actuating means including a pull link connection between the relatively rearward ends of said bars and the braking means for transmitting to the latter any rearward movement of either bar in response to thrust thereon occurring upon tendency of the pull car to overrun the motor car, thereby to apply said braking means.

6. A brake system for push cars and like trailer vehicles comprising, in combination, combined pull and thrust bars, one for each end of the car and each reciprocably mounted on the car frame, means at the relatively forward end of each bar for coupling the same to a motor car whereby the motor car can be coupled to either end of the pull car, a stop carried by each bar adjacent its coupling end and adapted normally to engage a fixed part of said frame, thereby to transmit draft to the car frame, wheel-braking means carried by said car, means for maintaining both said bars in a normal position in which their stops are in engagement with said frame parts and for rendering said braking means normally inactive, and actuating means operative between the braking means and the relatively rearward ends of said bars for transmitting to the braking means any rearward movement of either bar in response to thrust thereon occurring upon tendency of the push car to overrun the motor car, thereby to apply said braking means.

7. A brake system for push cars and like trailer vehicles comprising, in combination, combined pull and thrust bars, one for each end of the car and each reciprocably mounted on the car frame, means at the relatively forward end of each bar for coupling the same to a motor car whereby the motor car can be coupled to either end of the push car, a stop carried by each bar adjacent its coupling end and adapted normally to engage a fixed part of said frame thereby to transmit draft to the car frame, wheel-braking means carried by said car, and actuating means operative between the relatively rearward ends of said bars and the braking means for transmitting to the latter any rearward movement of either bar in response to thrust thereon occurring upon tendency of the pull car to overrun the motor car, thereby to apply said braking means, said actuating means including an equalizing bar pivoted intermediate its ends to said frame, one of said pull and thrust bars being connected to one end and the other to the other end of said equalizing bar, whereby rearward movement of either pull and thrust bar causes the equalizing bar to turn in the same direction, a rock shaft having an actuating arm, a pull link operative between the equalizing bar and the shaft actuating arm for translating turning movement of said equalizing bar into rocking movement of said shaft, and operating connections between the rock shaft and the braking means.

8. A brake system for push cars and like trailer vehicles comprising, in combination, combined pull and thrust bars, one for each end of the car and each reciprocably mounted on the car frame, means at the relatively forward end of each bar for coupling the same to a motor car whereby the motor car can be coupled to either end of the push car, a stop carried by each bar adjacent its coupling end and adapted normally to engage a fixed part of said frame, thereby to transmit draft to the car frame, wheel-braking means carried by said car, means for maintaining both said bars in a normal position in which their stops are in engagement with said frame parts and for rendering said braking means normally inactive, and actuating means operative between the braking means and the relatively rearward ends of said bars for transmitting to the braking means any rearward movement of either bar in response to thrust thereon occurring upon tendency of the push car to overrun the motor car, thereby to apply said braking means, said actuating means including an equalizing bar pivoted intermediate its ends to said frame, one of said pull and thrust bars being connected to one end and the other to the other end of said equalizing bar, whereby rearward movement of either pull and thrust bar causes the equalizing bar to turn in the same direction, a rock shaft having an actuating arm, a pull link operative between the equalizing bar and the shaft actuating arm for translating turning movement of said equalizing bar into rocking movement of said shaft, and operating connections between the rock shaft and the braking means.

9. A brake system for push cars and like trailer vehicles comprising, in combination, combined pull and thrust bars, one for each end of the car and each reciprocably mounted on the car frame, means at the relatively forward end of each bar for coupling the same to a motor car whereby the motor car can be coupled to either end of the push car, a stop carried by each bar adjacent its coupling end and adapted normally to engage a fixed part of said frame thereby to transmit draft to the car frame, wheel-braking means carried by said car at each side thereof, and actuating means operative between the relatively rearward ends of said bars and the braking means for transmitting to the latter any rearward movement of either bar in response to thrust thereon occurring upon tendency of the pull car to overrun the motor car, thereby to apply said braking means, said actuating means including a normally vertically disposed equalizing bar pivoted intermediate its ends on said frame to turn on a relatively short radius, one of said combined pull and thrust bars being connected to one and the other to the other end of the equalizing bar, whereby rearward movement of either pull and thrust bar causes the equalizing bar to turn in the same direction, a rock shaft having a normally vertically disposed actuating arm of relatively large radius and normally horizontally disposed crank arms of short radius, a pull link connection between the equalizing bar and the shaft actuating arm to transmit turning movement of the former to the latter, and hence to the shaft and crank arms thereof, and an operating connection between each of the crank arms and a braking means.

10. A brake system for push cars and like trailer vehicles comprising, in combination, combined pull and thrust bars, one for each end of the car and each reciprocably mounted on the car frame, means at the relatively forward end of each bar for coupling the same to a motor car whereby the motor car can be coupled to either end of the pull car, a stop carried by each bar adjacent its coupling end and adapted normally to engage a fixed part of said frame, thereby to transmit draft to the car frame, wheel-braking means carried by said car at each side thereof, means for maintaining both said bars in a normal position in which their stops are in engagement with said frame parts and for rendering said braking means normally inactive, and actuating means operative between the braking means and the relatively rearward ends of said bars for transmitting to the braking means any rearward movement of either bar in response to thrust thereon occurring upon tendency of the push car to overrun the motor car, thereby to apply said braking means, said actuating means including a normally vertically disposed equalizing bar pivoted intermediate its ends on said frame to turn on a relatively short radius, one of said combined pull and thrust bars being connected to one and the other to the other end of the equalizing bar whereby rearward movement of either pull and thrust bar causes the equalizing bar to turn in the same direction, a rock shaft having a normally vertically disposed actuating arm of relatively large radius and normally horizontally disposed crank arms of short radius, a pull link connection between the equalizing bar and the shaft actuating arm to transmit turning movement of the former to the latter, and hence to the shaft and crank arms thereof, and an operating connection between each of the crank arms and a braking means.

11. A brake system for push cars and like trailer vehicles comprising, in combination, a combined pull and thrust bar reciprocably mounted on the car frame, means at the relatively forward end of said bar for coupling the same to a motor car, a stop carried by said bar adjacent said end adapted normally to engage a fixed part of the car frame and operative to transmit draft to said frame, normally inactive wheel-braking means carried by said car, a first actuating means therefor operative between the braking means and the bar to transmit to said braking means any rearward thrust on the bar occurring upon tendency of the push car to overrun its motor car and thereby to apply said braking means, and a second and manually operable actuating means for applying the braking means, said second means being operable in part thru said first actuating means but being wholly independent of rearward thrust on the pull and thrust bars for its actuation.

12. A brake system for push cars and like trailer vehicles comprising, in combination, a combined pull and thrust bar reciprocably mounted on the car frame, means at the relatively forward end of said bar for coupling the same to a motor car, a stop carried by said bar adjacent said end adapted to engage a fixed part of the car frame and operative to transmit draft to said frame, wheel-braking means carried by said car, means for maintaining said stop in a normal position in which it engages said fixed frame part and for rendering said braking means normally inactive, a first brake actuating means operative between the braking means and the bar to transmit to the braking means any rearward thrust on the bar occurring upon tendency of the push car to overrun its motor car and thereby to apply said braking means, and a second and manually operable actuating means for applying the braking means, said second means being operable in part thru said first actuating means but being wholly independent of rearward thrust on either of the pull and thrust bars for its actuation.

13. A brake system for push cars and like trailer vehicles comprising, in combination, combined pull and thrust bars, one for each end of the car and each reciprocably mounted on the car frame, means at the relatively forward end of each bar for coupling the same to a motor car whereby the motor car can be coupled to either end of the push car, a stop carried by each bar adjacent its coupling end and adapted normally to engage a fixed part of said frame, thereby to transmit draft to the car frame, wheel-braking means carried by said car, means for maintaining both said bars in a normal position in which their stops are in engagement with said frame parts and for rendering said braking means normally inactive, and actuating means including a pull link connection between the braking means and the relatively rearward ends of said bars for transmitting to the braking means any rearward movement of either bar in response to thrust thereon occurring upon tendency of the push car to overrun the motor car, thereby to apply said braking means.

14. A brake system for push cars and like trailer vehicles comprising, in combination, combined pull and thrust bars, one for each end of the car and each reciprocably mounted on the car frame, means at the relatively forward end of each bar for coupling the same to a motor car whereby the motor car can be coupled to either end of the push car, a stop carried by each bar adjacent its coupling end and adapted normally to engage a fixed part of said frame, thereby to transmit draft to the car frame, wheel-braking means carried by said car, means for maintaining both said bars in a normal position in which their stops are in engagement with said frame parts and for rendering said braking means normally inactive, and brake actuating means including an equalizing bar pivoted intermediate its ends, one of said pull and thrust bars being connected to one end and the other to the other end of the equalizing bar whereby rearward movement of either pull and thrust bar effects turning movement of the equalizing bar in the same direction, and a pull link connection between the equalizing bar and the braking means.

ROBERT A. CONNER.